United States Patent
Rankin (10) Patent No.: US 11,108,671 B2
(45) Date of Patent: Aug. 31, 2021

(54) SYSTEMS AND METHODS FOR PROCESSING NETWORK TRAFFIC USING DYNAMIC MEMORY

(71) Applicant: John Rankin, Morgantown, WV (US)

(72) Inventor: John Rankin, Morgantown, WV (US)

(73) Assignee: Rankin Labs, LLC, Williamsport, OH (US)

(*) Notice: Subject to any disclaimer, the term of this patent is extended or adjusted under 35 U.S.C. 154(b) by 0 days.

(21) Appl. No.: 16/747,287

(22) Filed: Jan. 20, 2020

(65) Prior Publication Data

US 2020/0236026 A1 Jul. 23, 2020

Related U.S. Application Data

(60) Provisional application No. 62/794,994, filed on Jan. 21, 2019.

(51) Int. Cl.
| | | |
|---|---|---|
| *H04L 12/26* | (2006.01) | |
| *H04L 12/863* | (2013.01) | |
| *H04L 29/08* | (2006.01) | |
| *H04L 29/06* | (2006.01) | |

(52) U.S. Cl.
CPC ...... *H04L 43/0894* (2013.01); *H04L 43/0817* (2013.01); *H04L 47/62* (2013.01); *H04L 67/1097* (2013.01); *H04L 69/163* (2013.01)

(58) Field of Classification Search
CPC . H04L 43/0894; H04L 43/0817; H04L 47/62; H04L 67/1097; H04L 69/163
See application file for complete search history.

(56) References Cited

U.S. PATENT DOCUMENTS

| | | |
|---|---|---|
| 3,688,090 A | 8/1972 | Rankin |
| 4,493,027 A | 1/1985 | Katz et al. |
| 6,023,724 A | 2/2000 | Bhatia et al. |
| 6,567,416 B1 | 5/2003 | Chuah |
| 6,714,985 B1 | 3/2004 | Malagrino et al. |
| 6,757,248 B1 | 6/2004 | Li et al. |
| 7,103,025 B1 | 9/2006 | Choksi |
| 8,090,866 B1 | 1/2012 | Bashyam et al. |
| 8,125,904 B2 * | 2/2012 | Lund ............. H04L 47/27 370/231 |
| 8,155,117 B2 * | 4/2012 | Babbar ............ H04L 69/166 370/389 |
| 8,374,091 B2 | 2/2013 | Chiang |

(Continued)

OTHER PUBLICATIONS

Rabah, K., Steganography—The Art of Hiding Data, Information Technology Journal, 2004, pp. 245-269.

(Continued)

*Primary Examiner* — Arvin Eskandarnia
*Assistant Examiner* — Chhian (Amy) Ling
(74) *Attorney, Agent, or Firm* — Standley Law Group LLP (57) ABSTRACT

Systems and method for processing network traffic are provided. The network traffic includes a number of data packets representing a complete transmission which are located at a first electronic storage area. Each data packet including a data payload. A data block is generated by one or more processors according to software instructions for the received traffic. The data block includes a series of header pointers pointing to each of a series of headers and a data pointer pointing to the data payloads.

16 Claims, 5 Drawing Sheets

(56) References Cited

U.S. PATENT DOCUMENTS

| | | | |
|---|---|---|---|
| 8,397,151 | B2 | 3/2013 | Salgado et al. |
| 9,350,663 | B2 | 5/2016 | Rankin |
| 2001/0017844 | A1 | 8/2001 | Mangin |
| 2001/0019614 | A1 | 9/2001 | Madoukh |
| 2002/0041592 | A1 | 4/2002 | Van Der Zee et al. |
| 2002/0054570 | A1 | 5/2002 | Takeda |
| 2002/0071436 | A1 | 6/2002 | Border et al. |
| 2002/0164024 | A1 | 11/2002 | Arakawa et al. |
| 2003/0031198 | A1 | 2/2003 | Currivan et al. |
| 2003/0056009 | A1 | 3/2003 | Mizrachi et al. |
| 2004/0267945 | A1* | 12/2004 | Reiss ............... H04L 69/163 709/229 |
| 2005/0060538 | A1 | 3/2005 | Beverly |
| 2005/0105506 | A1 | 5/2005 | Birdwell et al. |
| 2005/0286517 | A1 | 12/2005 | Babbar et al. |
| 2006/0002681 | A1 | 1/2006 | Spilo et al. |
| 2006/0034317 | A1 | 2/2006 | Hong et al. |
| 2006/0133364 | A1 | 6/2006 | Venkatsubra |
| 2006/0259587 | A1 | 11/2006 | Ackerman et al. |
| 2007/0025388 | A1 | 2/2007 | Abhishek et al. |
| 2007/0028121 | A1 | 2/2007 | Hsieh |
| 2007/0112714 | A1 | 5/2007 | Fairweather |
| 2007/0223395 | A1 | 9/2007 | Lee et al. |
| 2007/0283125 | A1 | 12/2007 | Manczak et al. |
| 2008/0104313 | A1 | 5/2008 | Chu |
| 2010/0103830 | A1 | 4/2010 | Salgado et al. |
| 2011/0072234 | A1 | 3/2011 | Chinya et al. |
| 2011/0149891 | A1 | 6/2011 | Ramakrishna |
| 2011/0231630 | A1 | 9/2011 | Dannowski et al. |
| 2011/0238793 | A1 | 9/2011 | Bedare et al. |
| 2012/0289250 | A1 | 11/2012 | Fix et al. |
| 2012/0300648 | A1 | 11/2012 | Yang |
| 2012/0307678 | A1 | 12/2012 | Gerber et al. |
| 2013/0028121 | A1 | 1/2013 | Rajapakse |
| 2013/0058231 | A1 | 3/2013 | Paddon et al. |
| 2013/0091102 | A1 | 4/2013 | Nayak |
| 2014/0100014 | A1 | 4/2014 | Bennett, III et al. |
| 2014/0254598 | A1 | 9/2014 | Jha et al. |
| 2014/0280669 | A1 | 9/2014 | Harper, III et al. |
| 2014/0294019 | A1 | 10/2014 | Quan et al. |
| 2015/0100613 | A1 | 4/2015 | Osiecki et al. |
| 2015/0229714 | A1 | 8/2015 | Venkatsubra et al. |
| 2016/0077976 | A1 | 3/2016 | Raikin et al. |
| 2016/0269294 | A1 | 9/2016 | Rankin |
| 2017/0010900 | A1 | 1/2017 | Cobb |
| 2017/0090872 | A1 | 3/2017 | Mathew et al. |
| 2018/0018147 | A1 | 1/2018 | Sugawara |
| 2018/0060244 | A1 | 3/2018 | Godard et al. |
| 2018/0102975 | A1 | 4/2018 | Rankin |
| 2020/0067820 | A1 | 2/2020 | Rankin |
| 2020/0204343 | A1 | 6/2020 | Rankin |
| 2020/0233668 | A1 | 7/2020 | Rankin |

OTHER PUBLICATIONS

Information Sciences Institute, University of Southern California, RFC 791, Internet Protocol, DARPA Internet Program Protocol Specification, Sep. 1981.

Postel, J., RFC 792, Internet Control Message Protocol, DARPA Internet Program Protocol Specification, Sep. 1981.

Information Sciences Institute, University of Southern California, RFC 793, Transmission Control Protocol, DARPA Internet Program Protocol Specification, Sep. 1981.

McCann, J. et al., RFC 1981, Path MTU Discovery for IP version 6, Aug. 1996.

Mathis, M. et al., TCP Selective Acknowledgment Options, Oct. 1996.

Montenegro, G. et al., RFC 4944, Transmission of IPv6 Packets over IEEE 802.15.4 Networks, Sep. 2007.

Paxson et al., RFC 2330, Framework for IP Performance Metrics, May 1998.

Thubert, P. et al., LLN Fragment Forwarding and Recovery draft-thubert-6lo-forwarding-fragments-02, Nov. 25, 2014.

Li, T. et al., A New MAC Scheme for Very High-Speed WLANs, Proceedings of the 2006 International Symposium on a World of Wireless, Mobile and Multimedia Networks, 2006.

CSI International, TCP/IP for VSE, Command Reference, Version 2 Release 1, Aug. 2017.

CSI International, TCP/IP for VSE, Installation Guide, Version 2 Release 1, Aug. 2017.

CSI International, TCP/IP for VSE, Messages, Version 2 Release 1, Aug. 2017.

CSI International, TCP/IP for VSE, Optional Features Guide, Version 2 Release 1, Aug. 2017.

CSI International, TCP/IP for VSE, Programmer's Guide, Version 2 Release 1, Aug. 2017.

CSI International, TCP/IP for VSE, User Guide, Version 2 Release 1, May 2018.

CSI International, TCP/IP for VSE, Command Reference, Version 1 Release 5F, Mar. 2013.

CSI International, TCP/IP for VSE, Installation Guide, Version 1 Release 5F, Mar. 2012.

CSI International, TCP/IP for VSE, Messages, Version 1 Release 5F, Mar. 2013.

CSI International, TCP/IP for VSE, Optional Features, Version 1 Release 5F, Jun. 2012.

CSI International, TCP/IP for VSE, Programmer's Guide, Version 1 Release 5F, Mar. 2013.

CSI International, TCP/IP for VSE, User's Guide, Version 1 Release 5F, Mar. 2013.

* cited by examiner

SYSTEMS AND METHODS FOR PROCESSING NETWORK TRAFFIC USING DYNAMIC MEMORY

CROSS-REFERENCE TO RELATED APPLICATIONS

This application claims the benefit of U.S. provisional patent application Ser. No. 62/794,994 filed Jan. 21, 2019, the disclosures of which are hereby incorporated by reference as if fully restated herein.

TECHNICAL FIELD

Exemplary embodiments of the present invention relate generally to systems and methods for processing network traffic using dynamic memory.

BACKGROUND AND SUMMARY OF THE INVENTION

Two of the most important communication protocols used on the Internet and other similar networks are the Transmission Control Protocol (TCP) and the Internet Protocol (IP). Together, the TCP and IP protocols form core protocols of the larger Internet protocol suite used on packet-switched networks. That protocol suite is commonly referred to as the TCP/IP protocol because of the widespread adoption and implementation of the TCP and IP protocols.

The TCP/IP protocol was developed for the United States Advanced Research Projects Agency (ARPA). The TCP/IP protocol is a set of rules that enable different types of network-enabled or networked devices to communicate with each other. Those network devices communicate by using the TCP/IP standard, or format, to transfer or share data. TCP/IP rules are established and maintained by the Internet Engineering Task Force (IETF). The IETF is an international community of network designers, operators, vendors, and researchers concerned with the Internet's architecture and operation. The IETF's mission is to produce technical and engineering documents that influence the way people design, use and manage the Internet with the goal of improving its operations and efficiencies. These documents include protocol standards, best current practices and information updates of various kinds, and are commonly referred to as Request for Comments (RFC).

TCP can be used to establish a bi-directional connection between two clients wherein activity begins with a request for information made by one client to another client. A "client" may be any program or application that initiates requests for or sends information from one remote location to another. As used herein, the term "client" may refer to such applications including, but not limited to, web browsers, web servers, file transfer protocol (FTP) programs, electronic mail programs, line printer (LPR) programs also known as print emulators, mobile phone apps, and telnet programs also known as terminal emulators, all of which operate conceptually in an application layer.

TCP software accepts requests and data streams directly from clients and other daemons, sequentially numbering the bytes, or octets, in the stream during the time the connection is active. When required, the TCP software breaks the data stream into smaller pieces called segments (sometimes referred to as datagrams or packets generally) for transmission to a requesting client. The protocol calls for the use of checksums, sequence numbers, timestamps, time-out counters and retransmission algorithms to ensure reliable data transmission.

The IP layer actually performs the communication function between two networked hosts. The IP software receives data segments from the TCP layer, ensures that the segment is sized properly to meet the requirements of the transmission path and physical adapters (such as Ethernets and CTCs). IP changes the segment size if necessary by breaking it down into smaller IP datagrams, and transmits the data to the physical network interface or layer of the host.

The software that manages handling the TCP/IP RFCs may be referred to as a TCP/IP protocol stack. This software may be referred to as a stack because the different protocols are often layered into this type of organization. A TCP/IP stack may have, for example, the following layers: 1) Link drivers, 2) ARP, 3) IP, 4) TCP, 5) SSL/TLS, and 6) Applications. Inbound data may transfer from layer 1 to layer 6 in turn and outbound data may take the reverse direction going from layer 6 to 1.

Depending on the implementation, these different layers can operate under the same process, or can function independently. Within the IP layer, there are several separate operational functions: 1) Address resolution, 2) Routing, 3) Fragmentation, and 4) Protocol isolation. Again, inbound data may use these functions from 1 to 4 in secession and outbound data may go in reverse order from 4 to 1.

A frame of inbound data works its way through the stack, breaking the information down until the final payload that is destined for an application is exposed. Once the application completes operating upon the information, the response is once again passed to the stack. On the outbound operation, additional tags and headers are constructed that will be required to deliver the information back to its origin.

A TCP/IP stack processes incoming and outgoing IP traffic based upon the natural request of the network. Therefore, as transmissions arrive to be handled, the data is moved into buffers and passed from level to level within the system. This method of handling traffic utilizes a fixed series of buffers and eventually locates the user work areas defined by the socket layer that originates the ability to communicate. In other words, data flowing into a system using a traditional TCP/IP stack will populate fixed buffers that are created by the services in operation.

The common handling of TCP/IP traffic is managed through the population of fixed buffers. When a connection is opened by an application, there is a buffer provided that is sufficient to hold the network traffic related to the size of a TCP window. As the data flows across the network, data is moved in and out of this fixed buffer and there is a direct relationship between data buffers and flow control. Therefore, TCP window management is ultimately limited to the original established size of the buffer provided at connection open time.

There are a number of limiting issues that arise through the use of a predefined fixed buffer. The most significant is the failure to promote significant in bound and out bound traffic due to the unnecessary binding of the window flow control. To exacerbate this issue, implementation of TCP does not venture beyond traditional and expected behavior. TCP/IP stacks that have been developed are mostly available in C and open or license free source. These readily available versions function to limit the imagination and innovation that would occur without available source code. Furthermore, when such a volume of TCP/IP stack source code is available, it is most often used as a guide and thus retards exploration and innovation due to the common expectation.

As a result, TCP/IP stacks have been implemented with the standard expectation of fixed buffers relating to application creation for the purpose of flow control.

Therefore, what is needed is a system and method for processing network traffic using dynamic memory. The present invention is a system and method for processing network traffic using dynamic memory.

A more effective system and method of handling this traffic is realized by dynamically creating a block of memory sufficient to hold the specific elements of network traffic. This block of memory may be created at the time the traffic occurs, rather than before the traffic occurs as conventionally required. This block of network data may be passed from layer to layer without regard to the volume or dimensions of the network traffic. Therefore, rather than predetermining the amount of traffic a system can process and populating predetermined buffers, this dynamic system and process allows for an expansive level of network processing by allowing the number of data containers to dynamically increase to match the network needs.

These disclosures provide systems and methods where network traffic, such as but not limited to a TCP/IP network, drive the creation and handling of blocks of memory that are utilized for the stack, such as but not limited to a TCP/IP stack, and connection processing. These dynamically allocated memory storage areas contain the incoming and outgoing network traffic and are managed in a way which allows complete utilization without movement or transfers within storage. These systems and processes innovate the handling of connection flow by removing limitations upon the volume and complexity of the network traffic. By allowing physical memory storage to contain network traffic, rather than act as a predetermined and fixed buffer, the network can respond with far more flexibility, reliability, and performance.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
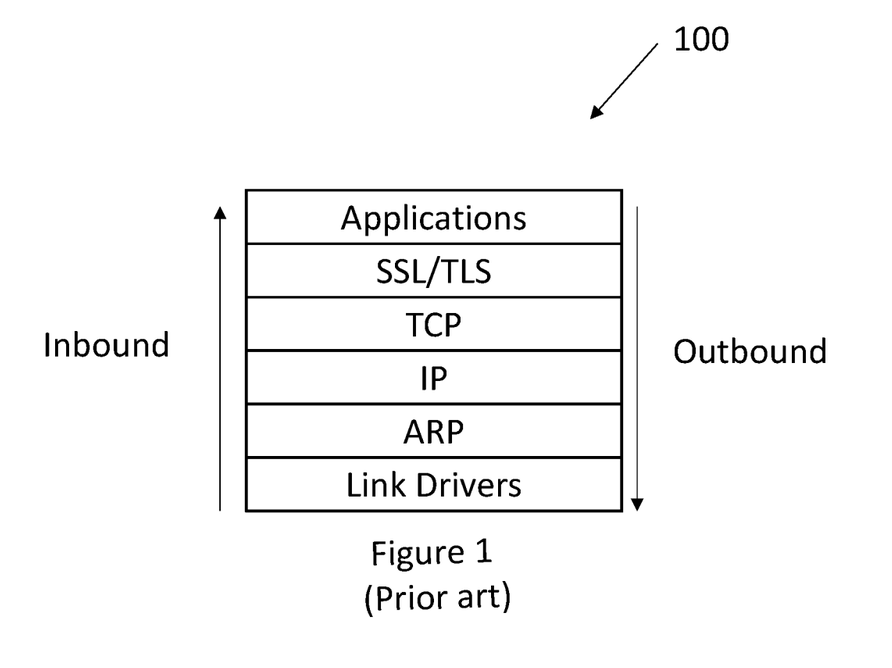
FIG. 1 is an exemplary TCP/IP stack.
Figure 2:
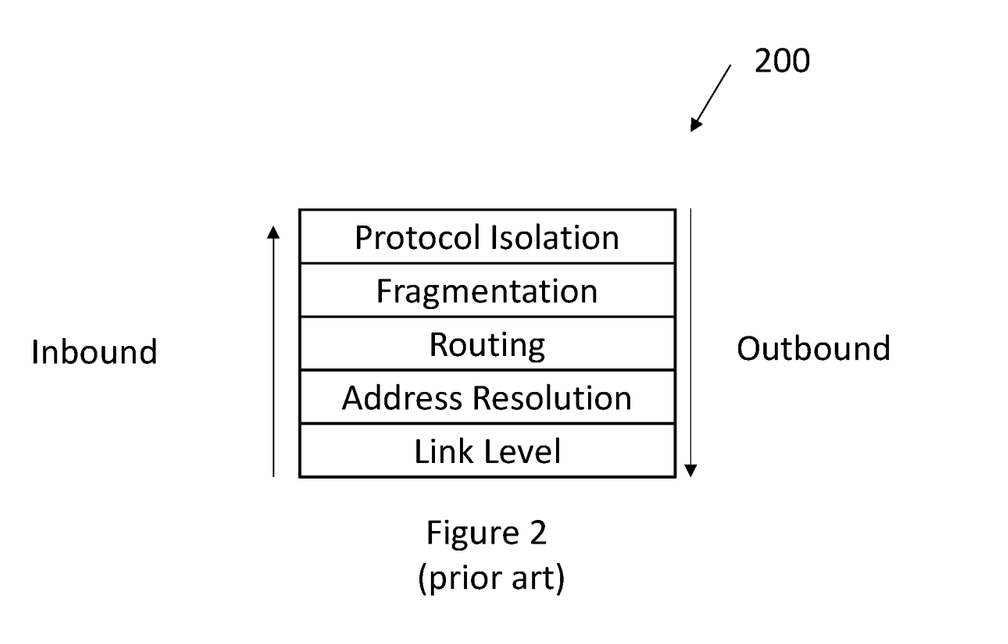
FIG. 2 is an exemplary IP layer.
Figure 3:
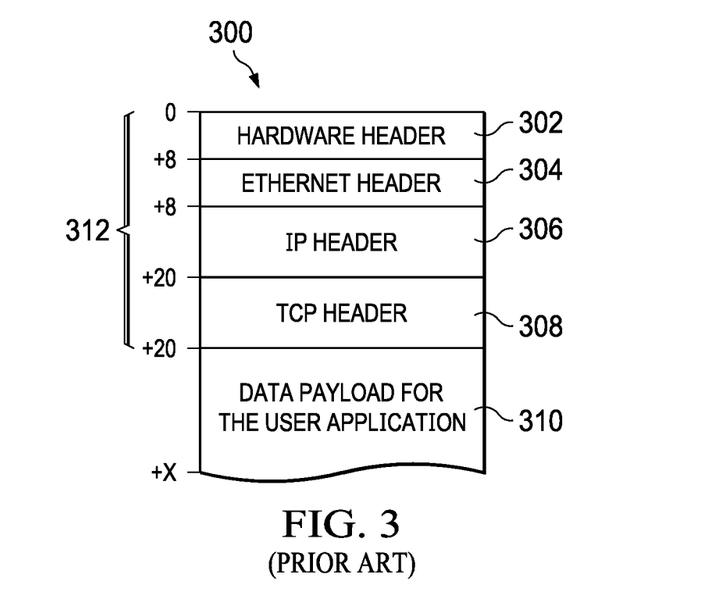
FIG. 3 is an exemplary layer of data in an exemplary TCP/IP transmission.

FIG. 1 is an exemplary TCP/IP stack 100, and FIG. 2 is an exemplary IP layer 200. Network traffic, such as that experienced in a TCP/IP network, is generally organized into layers of information that roughly relate to the processing that will occur within the stack 100. FIG. 3 is an exemplary layer of data 300 in an exemplary TCP/IP transmission. The data 300 from a user application may be appended with one or more headers, indicated generally at item 312, that may be required for transmission, routing, and delivery of data 310. The header(s) 312 may comprise a hardware header 302, an ethernet header 304, an IP header 306, and a TCP header 308, some combination thereof, or the like. Any number and type of header(s) 312 are contemplated. Any size data payload 310 may be utilized containing any number of types of data.

Figure 4:
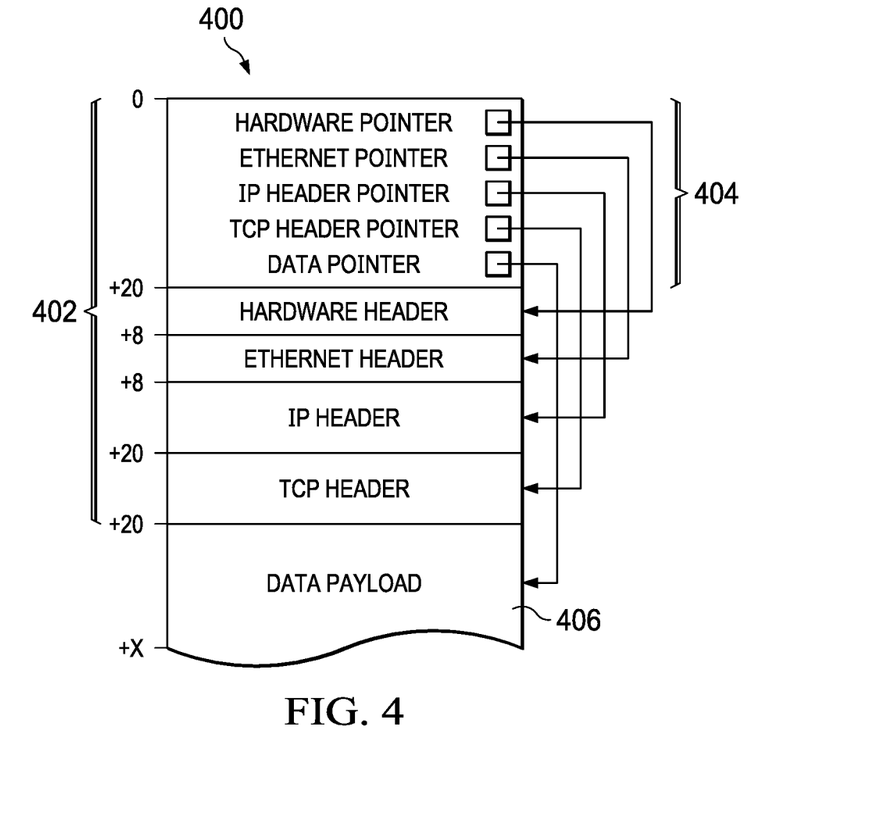
FIG. 4 is an exemplary dynamically allocated data block.

FIG. 4 is an exemplary dynamically allocated data block 400. The presentiment of TCP/IP traffic may result in the allocation of a single data block 400. The data block 400 may have its own header(s), as indicated generally at 402 associated with a data payload 406, and also contain the complete transmission as one cohesive unit. The header(s) 402 may comprise some or all of the headers 312 shown or described with regards to FIG. 3, such as but not limited to the hardware header 302, the ethernet header 304, the IP header 306, and the TCP header 308. The header(s) 402 may further comprise one or more pointers 404. With the complete transmission contained within a single unit of storage (i.e., data block 400), it may be possible to manage the use of the data through a series of pointers, as indicated generally at 404, to information stored within the data block header(s) 402. All other stack implementations have isolated the information into predefined containers rather than allow for the flexibility of a dynamic construction.

Figure 5:
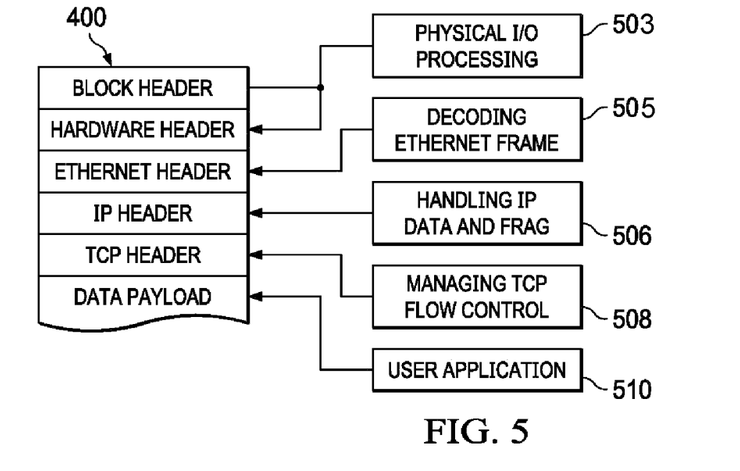
FIG. 5 is a simplified block diagram illustrating exemplary processing of network traffic using the data blocks of FIG. 4.

FIG. 5 is a simplified block diagram illustrating exemplary processing of network traffic using the data blocks 400 of FIG. 4. Since the data blocks 400 may each comprise all relevant information, the data blocks 400 may be passed from process to process without requiring movement or reallocation. Such processes may include, for example without limitation, physical I/O processing 503, decoding ethernet frame 505, handling IP data and fragments 506, managing TCP flow control 508, and user applications 510. As each process of the TCP/IP stack 100 analyzes the incoming or outgoing transmission, the data block header 402 may be updated to reflect realistic pointers 404 and observations that may be used by other processes. For example, data transmissions arrive by some method of physical distribution. This physical and electrical interaction is often different depending upon the physical connector, adapter, or linkage. Therefore, the unit specific process that handles the physical connection is in the best position to determine the time of arrival, the point of payload data, and the overall length of the transmission. All of these pieces of information may be recorded and updated within the data block header 402 so as to be available for the next process in the stack 100 to receive the data block 400 for processing.

Figure 6:
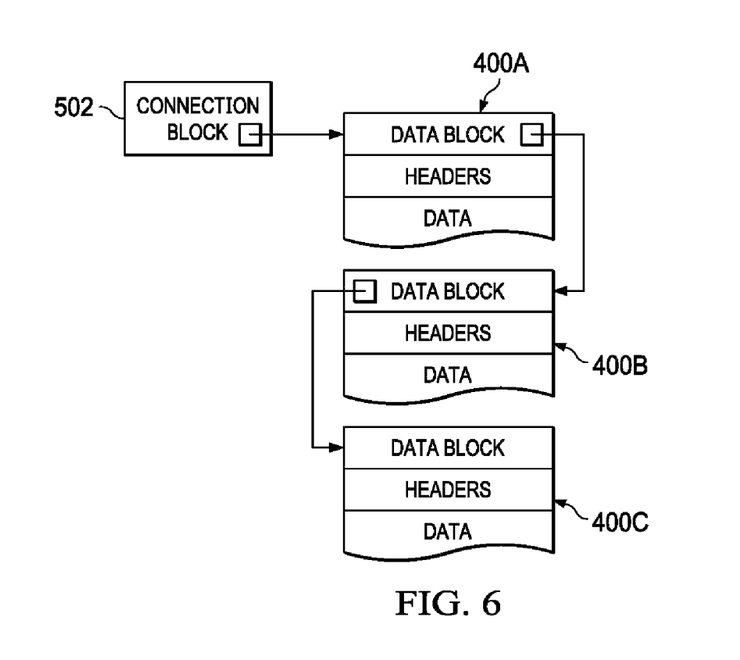
FIG. 6 is a simplified block diagram illustrating exemplary processing of network traffic using the data blocks of FIG. 4.

FIG. 6 is a simplified block diagram illustrating exemplary processing of network traffic using the data blocks 400 of FIG. 4. The use of connected data blocks 400 into a single unit may also serve for effective management of a TCP connection flow. Normally, TCP connection flows are limited by the pre-allocated buffers created while the connection is open. However, by dynamically allocating a data block 400 that contains real world transmission data, the flow of information may be adapted with often unexpected flexibility and performance.

For example, without limitation, a chain of data blocks 400A, 400B, and 400C may represent the processing of information and may relate to the actual traffic flow rather than forced segmenting, moving, and parking of information within fixed buffers. Each of the data blocks 400A, 400B, and 400C in a chain may be connected by a connection block 502. Each of the data blocks 400A, 400B, and 400C may comprise one or more pointers, or other connections, pointing to the subsequent blocks 400A, 400B, and 400C in the chain. Any number of data blocks 400A, 400B, and 400C may be utilized. The blocks 400A, 400B, and 400C may be linked in linear or non-linear fashions.

Figure 7:
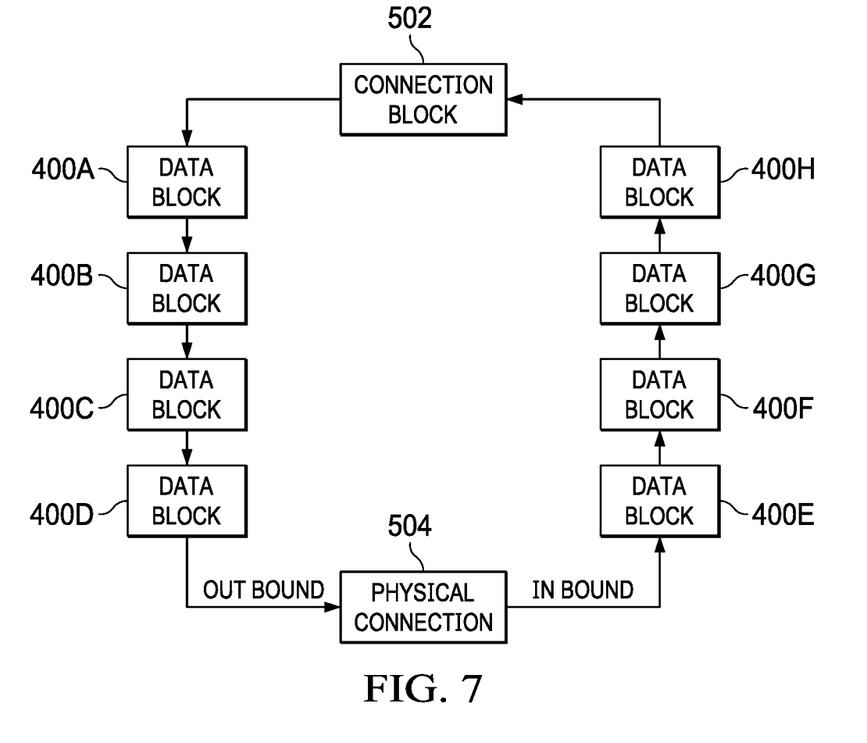
FIG. 7 is a simplified block diagram illustrating exemplary processing of network traffic using the data block of FIG. 4.

FIG. 7 is a simplified block diagram illustrating exemplary processing of network traffic using the data blocks 400 of FIG. 4. This process of allocating a data block 400 to contain network traffic, rather than using predetermined and fixed buffers, provides for significant improvements over current TCP/IP stack implementations. These data blocks 400A, 400B, 400C, 400D, 400E, 400F, 400G, and 400H may serve as internal management structures that facilitate the operation of a TCP/IP stack. For example, without limitation, the connection block 502 may connect to outbound data blocks 400 (in the illustrated example, data blocks 400A, 400B, 400C, and 400D), which may connect to inbound data blocks 400 (in the illustrated example, data blocks 400E, 400F, 400G, and 400H) by way of a physical connection 504. The last inbound data block 400 (in the illustrated example, data block 400H) may connect with the first outbound data block 400 (in the illustrated example, data block 400A) by way of the connection block. Each of the data blocks 400A, 400B, 400C, 400D, 400E, 400F, 400G, and 400H may be connected to one another using pointers, though other connections may be utilized. Any number of data blocks 400A, 400B, 400C, 400D, 400E, 400F, 400G, and 400H may be utilized. The blocks 400A, 400B, 400C, 400D, 400E, 400F, 400G, and 400H may be linked in linear or non-linear fashions.

By using this innovative system and process, the following advantages, which are exemplary but do not represent a comprehensive list of advantages, may be achieved:

Encouragement of data flow may occur through a flexible expansion of data within the TCP window. In other words, in the traditional TCP window management the advertised size of the window may be based upon the available space in the connection buffer that has not been read by the application. However, with dynamic data blocks 400, it is possible to allow far more incoming information to queue in storage while waiting for the application to process the data blocks 400, thus advertising a larger window that the application would limit due to its operation.

Management of retransmissions may be far more easily controlled due to the one to one relationship between data blocks 400 to transmission units. The retransmission of TCP data is the most sensitive part of the data flow operation and improving its efficiency will improve overall network performance.

By limiting data block 400 creation to the actual needs of the network, far more efficient use of memory storage is achieved. In other words, if a connection process always allocates the maximum buffer size necessary for a connection, there will be an excess of available storage consumed, due to potentially small actual requirements. However, by allocating dynamically only what is necessary, a conservative approach to memory is achieved.

By implementing this flexible process, storage retransmission and control flow are managed with greater efficiency and performance.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing device. The electronic devices may be personal computers, smartphone, tablets, databases, servers, or the like. The electronic connections and transmissions described herein may be accomplished by wired or wireless means.

What is claimed is:

1. A method for managing TCP/IP network traffic coming into and out of a TCP/IP protocol stack, said method comprising the steps of:

receiving network traffic at said TCP/IP stack comprising unfragmented data packets;

generating one or more data blocks in memory for the received network traffic, wherein each of the one or more data blocks comprise a header and at least a portion of the received network traffic, wherein the step of generating said one or more data blocks is not performed until each of said data packets representing a complete, unfragmented data transmission are received;

organizing each of the one or more data blocks into a chain;

associating at least one of the one or more data blocks in the chain with a connection block;

passing the one or more data blocks between stack-oriented processes;

updating the headers for each of the one or more data blocks to reflect accumulated updates regarding the content of the received network traffic;

queuing each of the one or more data blocks from the connection block;

using each of the one or more data blocks to manage the flow of data;

holding an incoming queue of network traffic arriving from the TCP/IP network; and holding an outgoing queue of network traffic leaving from the TCP/IP stack until a determination is made that retransmission is no longer necessary.

2. The method of claim 1 wherein:

each of said headers of each of said one or more data blocks comprise:
- a hardware pointer pointing to a hardware header;
- an ethernet pointer pointing to an ethernet header;
- an IP header pointer pointing to an IP header;
- a TCP header pointer pointing to a TCP header; and
- a data pointer pointing to a data payload.

3. The method of claim 2 further comprising the steps of:

updating the headers of the one of said one or more data blocks as the one or more data blocks are moved through the stack-oriented processes based on observations made by the stack-oriented process during processing of the one or more data blocks, wherein each of said stack-oriented processes comprise:
- physical I/O processing;
- decoding ethernet frame;
- handling IP data and fragments;
- managing TCP flow control; and
- user applications.

4. The method of claim 3 wherein:

said observations in the physical I/O processing comprise physical connectors, adaptors, and linkages used to transmit and receive the one or more data blocks.

5. The method of claim 4 wherein:

said one or more data blocks comprises all data necessary to generate a complete copy of a given webpage.

6. The method of claim 5 wherein:

said one or more data blocks comprises each fragment of a previously fragmented transmission.

7. The method of claim 6 wherein:

each of said one or more data blocks are organized into said chain using pointers;

said chain is organized in a linear fashion; and said at least one of the one or more data blocks in the chain is associated with a connection block by a pointer.

8. The method of claim 7 wherein:

said chain comprises:
- a physical connection pointing to a first one of a number of inbound ones of said one or more data blocks;
- said number of inbound ones of said one or more data blocks, each of which point to a subsequent one of the number of inbound ones of said one or more data blocks, and a last one of said number of inbound ones of said one or more data blocks which points to said connection block;
- said connection block pointing to a first one of a number of outbound ones of said one or more data blocks; and
- said number of outbound ones of said one or more data blocks, each of which point to a subsequent one of said number of outbound ones of said one or more data blocks, and a last one of said number of outbound ones of said one or more data blocks which points to said physical connection.

9. A method for managing network traffic coming into and out of a TCP/IP protocol stack, said method comprising the steps of:

receiving a request to transmit or receive network traffic at one or more electronic storage devices, wherein said network traffic comprises a number of data packets, wherein each of said number of data packets comprise a data payload, and wherein each of said number of data packets represent a complete, unfragmented data transmission; and generating one or more data blocks for the network traffic, said one or more data blocks comprising a series of header pointers pointing to each of a series of headers indicating processing instruction for said one or more data blocks and one or more data pointers pointing to the data payloads for each of the number of data packets;

wherein the step of generating said one or more data blocks is not performed until each of said number of data packets representing the complete, unfragmented data transmission are received.

10. The method of claim 9 wherein:

said network comprises a TCP/IP network.

11. The method of claim 9 further comprising the steps of:

connecting each of said one or more data blocks to one another by way of pointers.

12. The method of claim 11 wherein:

each of said one or more data blocks are connected in a linear fashion by one or more pointers to form a chain.

13. The method of claim 12 further comprising the steps of:

providing a connection block, wherein at least one of said one or more data blocks comprises a pointer to said connection block.

14. The method of claim 13 wherein:

the data payloads of each of said one or more data blocks comprise inbound network traffic.

15. The method of claim 9 wherein:

said complete, unfragmented transmission comprises all data necessary to generate a webpage.

16. The method of claim 9 wherein:

said complete, unfragmented transmission comprises each fragment of a previously fragmented transmission.

* * * * *